(12) United States Patent
Schoenfuss et al.

(10) Patent No.: US 8,511,503 B2
(45) Date of Patent: Aug. 20, 2013

(54) FUEL TANK

(75) Inventors: Steffen Schoenfuss, Odenthal (DE);
Christina Kallas, Rommerskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 12/771,323

(22) Filed: Apr. 30, 2010

(65) Prior Publication Data

US 2010/0276431 A1 Nov. 4, 2010

(30) Foreign Application Priority Data

May 4, 2009 (EP) ..................................... 09159294

(51) Int. Cl.
*B65D 88/12* (2006.01)
(52) U.S. Cl.
USPC .......................................... 220/562; 137/154
(58) Field of Classification Search
USPC .................. 224/488; 137/44, 571, 576, 154,
137/806; 73/707; 220/746, 745, 89.1, 562,
220/564, 567.2, 23.8, 501, 500
IPC ................ B60K 15/03, 15/063, 15/067, 15/077
See application file for complete search history.

(56) References Cited

U.S. PATENT DOCUMENTS

| | | | | | |
|---|---|---|---|---|---|
| 1,979,203 | A * | 10/1934 | Mellon | ......................... | 137/591 |
| 2,840,259 | A * | 6/1958 | Steidl | ............................ | 220/563 |
| 3,057,588 | A * | 10/1962 | Kolbe | ........................ | 244/135 R |
| 3,059,802 | A * | 10/1962 | Mitchell | ........................ | 220/675 |
| 3,542,239 | A * | 11/1970 | Seiden et al. | .................. | 220/746 |
| 4,013,195 | A * | 3/1977 | Ferris | ................................ | 222/95 |
| 4,354,521 | A * | 10/1982 | Harde | ............................ | 137/571 |
| 4,964,531 | A * | 10/1990 | Caniglia et al. | ................ | 220/501 |
| 5,392,804 | A * | 2/1995 | Kondo et al. | ................... | 137/202 |
| 5,850,933 | A * | 12/1998 | Pazik | ............................ | 220/563 |
| 6,527,008 | B2 * | 3/2003 | Meyer et al. | .................... | 137/587 |
| 6,568,556 | B1 * | 5/2003 | Kahler et al. | .................. | 220/563 |
| 7,648,749 | B1 * | 1/2010 | Taylor | ................................ | 428/98 |
| 2003/0205272 | A1 * | 11/2003 | Benjey et al. | .................. | 137/202 |
| 2004/0244844 | A1 * | 12/2004 | Krogull et al. | ................. | 137/576 |
| 2005/0172999 | A1 * | 8/2005 | Ohshiro et al. | ................ | 137/202 |
| 2006/0207991 | A1 * | 9/2006 | Sugiura | ........................ | 220/563 |
| 2008/0190936 | A1 * | 8/2008 | Kobayashi et al. | ............. | 220/564 |
| 2009/0078705 | A1 * | 3/2009 | Ramsay | ........................ | 220/562 |
| 2009/0321461 | A1 * | 12/2009 | Vulkan et al. | .................. | 220/746 |

FOREIGN PATENT DOCUMENTS

| | | |
|---|---|---|
| DE | 3040160 A1 | 6/1982 |
| DE | 4202643 A1 | 8/1993 |
| DE | 102004011119 A1 | 9/2005 |
| EP | 1803650 A | 7/2007 |
| JP | 59143723 A | 8/1984 |
| JP | 62191220 A | 8/1987 |
| JP | 2007331486 A * | 12/2007 |

OTHER PUBLICATIONS

European Search Report dated Oct. 21, 2009 for European Patent Application No. 09159294.9 Filed May 4, 2009, pp. 1-5.

* cited by examiner

*Primary Examiner* — Robert J Hicks

(57) ABSTRACT

A liquid container (1) for holding a liquid (2) of a motor vehicle, having a front wall (4) arranged in the direction of travel of the vehicle and a rear wall (6) opposed thereto and an upper wall (8). To reduce sloshing noises generated by having a wave forming in the liquid container (1) due to acceleration, at least one compensating tube (24) is provided, having a first opening (27), a connecting portion (26) and a second opening (28). The first opening (27) arranged proximate the front wall (4), and the second opening (28) arranged proximate the rear wall (6). The connecting portion (26) fluidly couples the first and second openings (27 and 28).

24 Claims, 3 Drawing Sheets

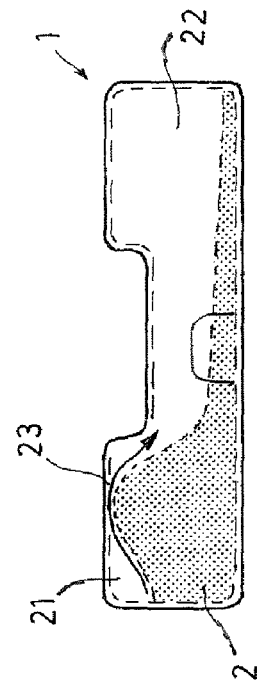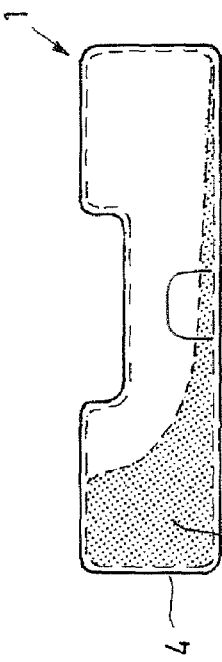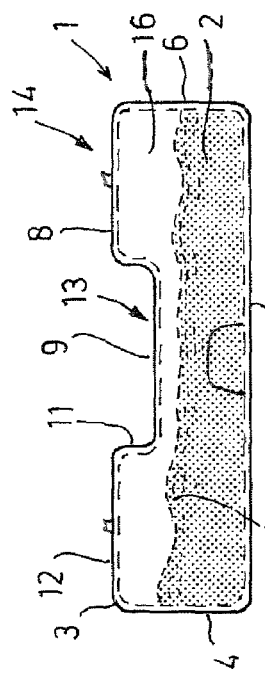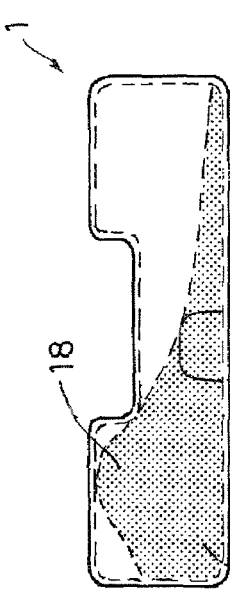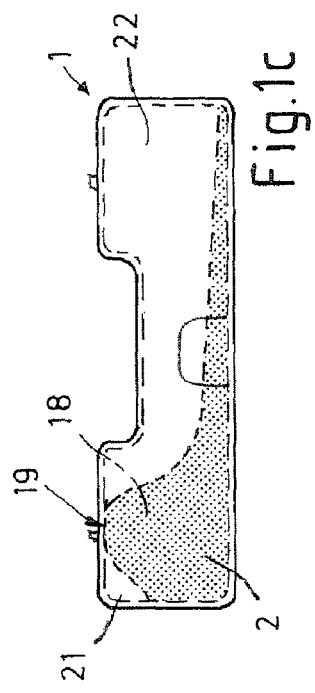

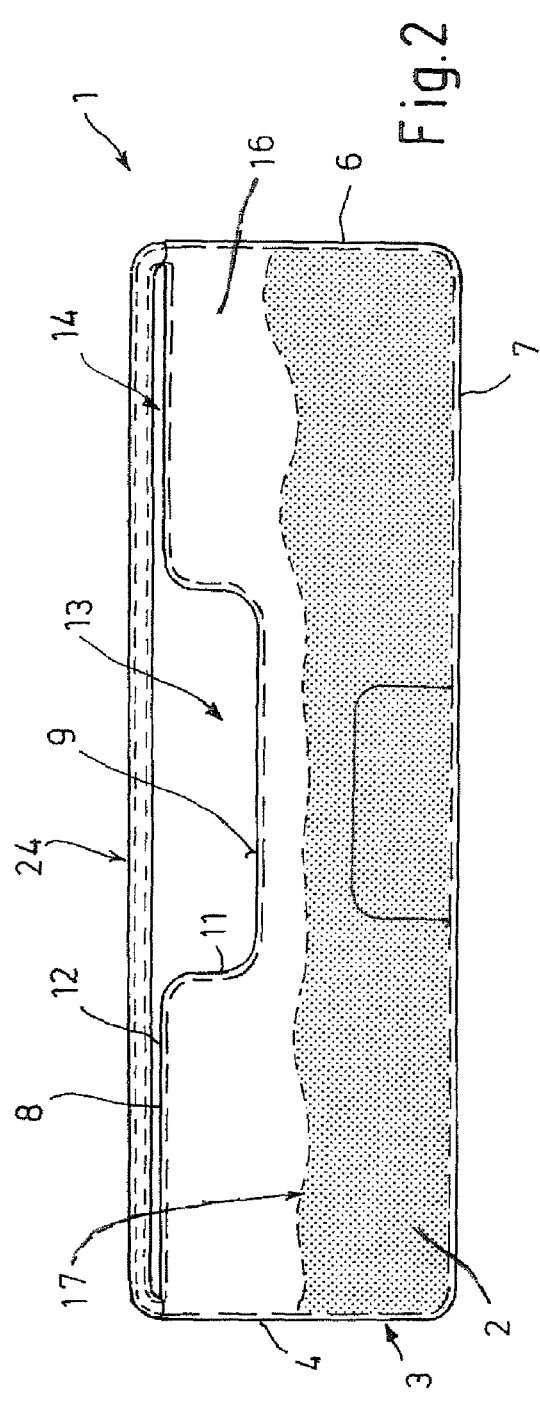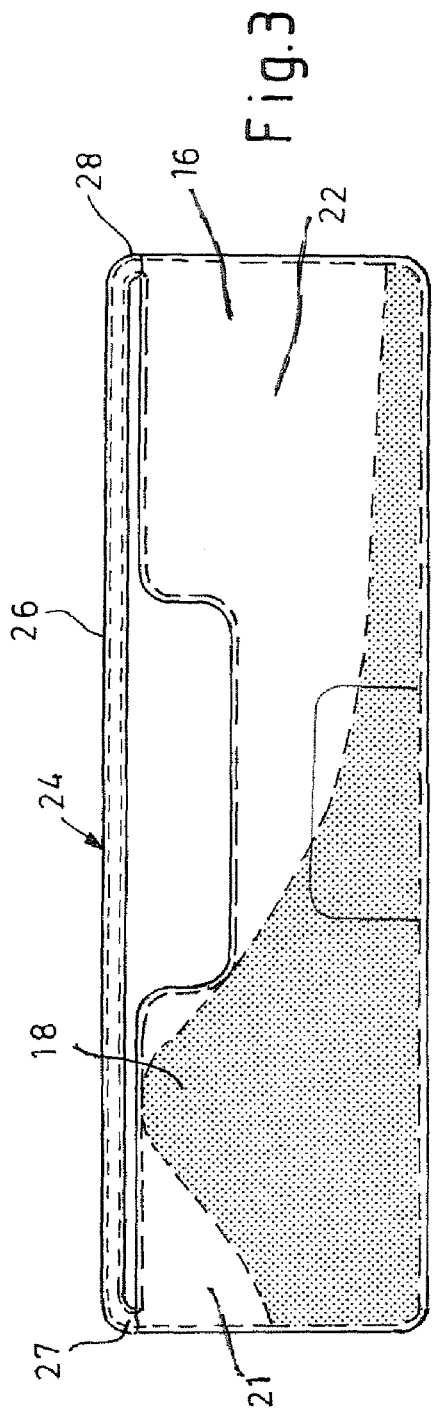

FUEL TANK

CROSS-REFERENCE TO RELATED APPLICATIONS

This application claims foreign priority benefits under 35 U.S.C. §119(a)-(d) to EP 09 159 294.9 filed May 4, 2009, which is hereby incorporated by reference in its entirety.

BACKGROUND

1. Technical Field

The disclosure relates to a liquid container for a motor vehicle.

2. Background Art

Accelerations in a motor vehicle cause fuel in the fuel tank to move. In particular, during a negative acceleration, e.g., braking, fuel sloshes against the front wall, producing sloshing sounds.

Substantially horizontal waves (in a direction perpendicular to a longitudinal axis of the vehicle) are produced during braking, with a static pressure prevailing in the interior of the container between the surface of the liquid and the upper wall. This gives rise to a growing wave due to the inertia of the liquid. Depending on the magnitude of the acceleration and the height of the liquid in the container, the wave crest may contact the upper wall of the container thereby enclosing a volume of air between the wave and the front wall. As the wave moves further in the direction toward the front wall, the air in the enclosed volume is compressed with a reduced pressure forming in an enclosed volume between wave crest and the rear wall. The sloshing noise results from the formation of a sloshing wave which divides the container into two separated volumes with differing pressures. The noise can be generated when the When an opening is formed in the wave, air escaping from the lower pressure volume to the higher pressure volume causes the sloshing noise.

In an effort to save fuel, some vehicles are applying a stop-start strategy in which the internal combustion engine is automatically turned off when the vehicle is stationary. Since the vehicle may have recently been moving, the fuel could be sloshing in the fuel tank. In vehicles in which the engine remains operational during periods in which the vehicle is stationary, the sloshing is often not noticed over the engine noise. However, in a stationary vehicle, such noise may be heard and considered objectionable by the vehicle operator.

SUMMARY

To overcome at least one background problem, a liquid container for a motor vehicle is disclosed which has a liquid contained therein, a front wall arranged in a direction of travel of the vehicle, a rear wall opposed thereto, and an upper wall. A compensating tube is provided on the liquid container, the tube having: a first opening coupled to a first volume, with the first volume formed by a sloshing wave moving toward the front wall; a second opening coupled to a second volume with the second volume formed by the sloshing wave and the rear wall; and a connecting portion connecting the two openings. The first volume is separated from the second volume by the sloshing wave. The first and second openings are coupled via the connection portion of the compensating tube. The connecting portion is within container, in one embodiment and is outside the container in another embodiment. In some embodiments, the liquid is fuel and the container is a fuel tank. The sloshing wave is formed in response to acceleration on the container in a direction toward the rear wall.

In containers without compensating tubes, pressures in first and second volumes separated by a wave differ. The pressure difference leads to an escape of gas from one volume to the other and the wave hitting the wall harder due to pressure acting on the wave. By providing a compensating tube, the first and second volumes are fluidly coupled and a pressure difference between the two volumes does not develop.

BRIEF DESCRIPTION OF THE DRAWINGS

FIGS. 1a to 1e show a liquid container with a wave moving across the liquid container; and FIGS. 2-5 are cross sections of a liquid container including a compensating tube at a range of phases of movement of a wave across the liquid container.

DETAILED DESCRIPTION

Figure 4:
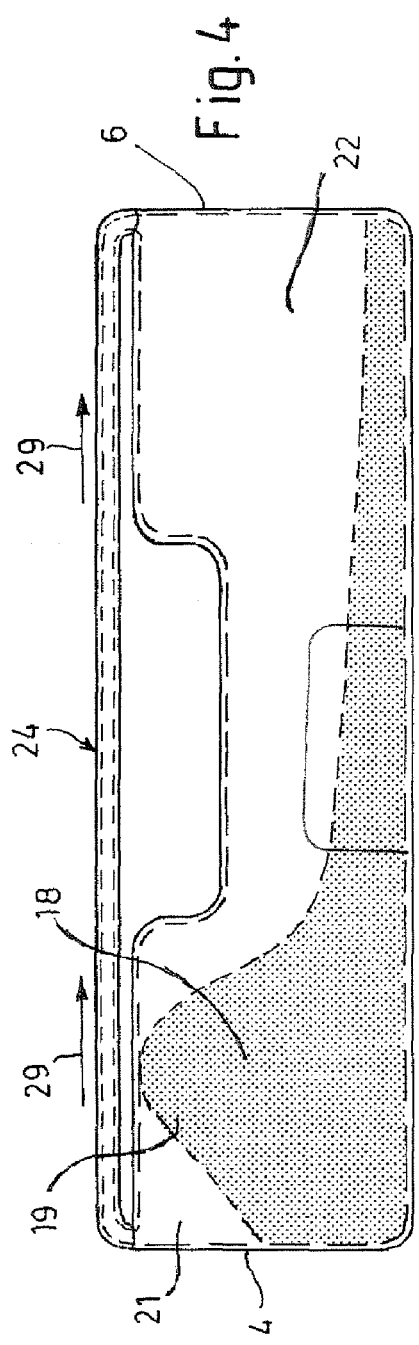

As those of ordinary skill in the art will understand, various features of the embodiments illustrated and described with reference to any one of the Figures may be combined with features illustrated in one or more other Figures to produce alternative embodiments that may not be explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations with other liquid tanks or container configurations.

FIGS. 1a-1e show a liquid container 1, which may be a fuel tank for a motor vehicle. A liquid 2, e.g. fuel, is stored in the liquid container 1. By way of example, liquid container 1 is, viewed in cross section, rectangular in its embodiment. Of course, liquid container 1 can also have other geometrical configurations. Liquid container 1 has a jacket 3 surrounding a volume. Jacket 3 has wall portions 4, 6, 7 and 8. Wall portion 4 is arranged in the direction toward a front of the vehicle, i.e. in the direction of travel of the vehicle, and can be designated as the front wall 4. The wall portion 6 opposed thereto can be designated as the rear wall 6. Owing to the view in FIGS. 1a-3, wall portions of the jacket 3, which can be designated as side walls, are not seen. Wall portion 7 can be designated as the bottom wall 7 and wall portion 8 opposing the bottom wall 7 can be designated as upper wall 8.

Upper wall 8 is, viewed in cross section, U-shaped in its embodiment with a base web 9 and two U-shaped portions 11 that each merge with an extension 12, of which one adjoins front wall 4 and the other adjoins rear wall 6.

U-shaped legs 11 are, by way of example, embodied in such a way that base web 9 is displaced, based on extensions 12, in the direction toward bottom wall 7. Upper wall 8 therefore has a depression 13. To this extent, the liquid container 1 has elevations 14 in the region of extensions 12.

Merely by way of example, liquid container 1 is half-filled with liquid 2. In the interior 16 of liquid container 1, a gas, such as air with fuel vapor, is above the surface of the liquid.

Substantially horizontal waves 17 are produced during a braking process or during a negative acceleration of the motor vehicle. A static pressure prevails in the interior 16 of liquid container 1 (FIG. 1a).

The inertia of liquid 2 gives rise in the region of the front wall 4 to a sloshing wave 18 moving in the direction toward front wall 4.

Sloshing wave 18 enters with its wave crest 19 into contact with upper wall 8 in FIG. 1c. This results in the formation, in the interior 16 of the liquid container 1, of two volumes 21 and 22 which are separated from each other by the liquid wall (sloshing wave 18). Volume 21 is completely enclosed by the sloshing wave 18, the front wall 4 and the upper wall 8. In view shown in FIGS. 1c-1d, volume 22 is arranged to the right of sloshing wave 18. The volume enclosed in volume 21 is compressed by the sloshing wave 18. An excess pressure prevails in the volume 21 with respect to volume 22 (FIG. 1c).

Due to further movement of sloshing wave 18 towards front wall 4, the volume enclosed in volume 21 continues to be compressed until the excess pressure is of an amount such that the volume escapes between the wave crest 19 and upper wall 8 in the direction toward the volume 22. This is indicated in FIG. 1d by an arrow 23.

Compensation of pressure in volume 21 generates a vacuum which draws sloshing wave 18 in the direction toward front wall 4, so that sloshing wave 18 strikes intensively against front wall 8 (FIG. 1e).

This sloshing or striking against the wall may be heard by and disturb passengers of the vehicle. This sloshing noise can be heard all the more clearly if the internal combustion engine is switched off, e.g. on account of a start-stop strategy to reduce fuel consumption, and/or if other sources of noise emission are inoperative.

According to an embodiment of the disclosure, at least one compensating tube 24 is provided. Compensating tube 24 has a first opening 27 and a second opening 28 and a connecting portion 26 between the two openings 27 and 28. Liquid container 1, as shown in FIGS. 2 to 5, is otherwise configured in the same way as was described with reference to FIGS. 1a-e.

Openings 27 and 28 of the compensating tube 24 are fluidly connected with the interior 16 of liquid container 1. Opening 27 is located proximate an upper portion of front wall 4. Opening 28 is located proximate an upper portion of rear wall 6. In one embodiment, compensating tube 24 is arranged, as a separate element with its connecting portion 26, outside liquid container 1. Alternatively, connecting portion 26 is inside liquid container 1.

As shown in FIG. 2, braking of the motor vehicle gives rise to substantially horizontal waves 17 which grow to form the sloshing wave 18 (inertia), as has already been described with reference to FIGS. 1a and 1b. The two volumes 21 and 22, which are separated from each other by the liquid wall (sloshing wave 18), are also formed.

Figure 5:
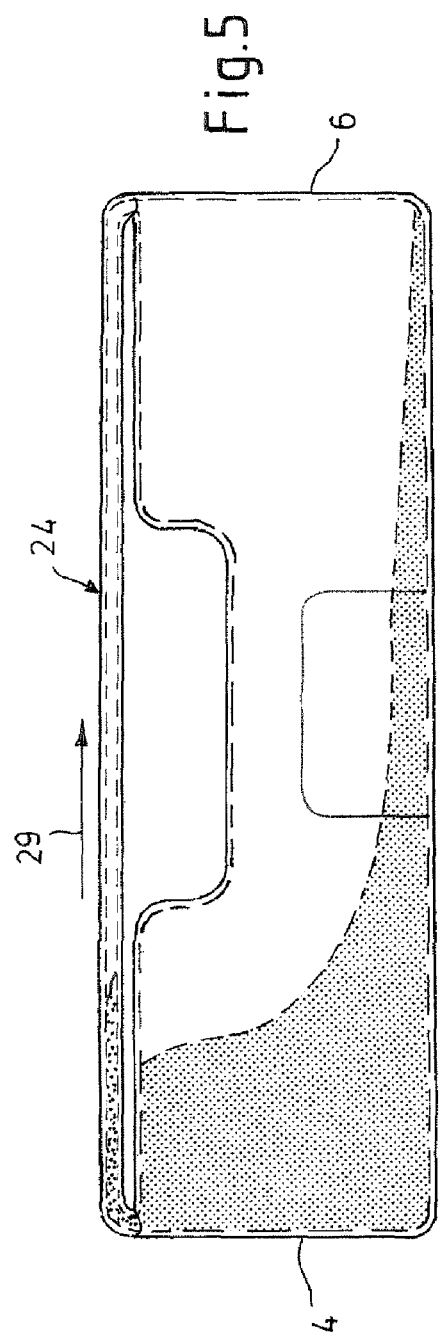

Compensating tube 24 establishes a fluid connection between volumes 21 and 22 to allow pressure compensation between volumes 21 and 22, in FIG. 4. The volume enclosed in volume 21 no longer suddenly escapes because the pressure is balanced between volumes 21 and 22, as indicated by arrows 29. Referring to FIG. 5, sloshing wave 18 is not forced into wall 4, again due to the pressure balancing. In some situations, liquid enters connecting portion 26. Such liquid drains out of connecting portion 26 when the wave retreats.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

What is claimed:

1. A liquid container (2) for a motor vehicle, the container having a front wall (4) arranged in a direction of travel of the vehicle, a rear wall (6) opposed thereto, and an upper wall (8), the container further comprising:
   a hollow compensating tube (24) having:
      a first opening (27) coupled to a first volume (21), the first volume (21) being formed by a sloshing wave (18) moving toward the front wall (4), the first volume having as side portions thereof portions of the front wall, frontal portions of the upper wall and frontal portions of the sloshing wave;
      a second opening (28) coupled to a second volume (22), the second volume (22) being formed by rear portions of the sloshing wave (18), rear portions of the upper wall, and portions of the rear wall (6); and
      a connecting portion (26) connecting the two openings (27, 28) wherein the first volume (21) is separated from the second volume (22) by the sloshing wave (18); and
   wherein the connection portion provides a completely enclosed passageway between the first opening and the second opening.

2. The container (2) of claim 1 wherein the connecting portion (26) is within container (2).

3. The container (2) of claim 1 wherein the connecting portion (26) is outside container (2).

4. The container (2) of claim 1 wherein the container is a fuel tank.

5. The container (2) of claim 1 wherein the sloshing wave (18) is formed in response to acceleration on the container in a direction toward the rear wall (6).

6. The container (2) of claim 4 wherein stored liquid is fuel.

7. A liquid container comprising:
   front, rear, and upper outer walls;
   a hollow compensating tube coupled to the liquid container, the compensating tube comprising:
   a connecting portion;
   a first opening terminating in a first corner region within the container, the first corner region being in direct contact with, and being formed by, the front and upper walls fluidly coupling the connecting portion with the liquid container; and
   a second opening terminating in a second corner region within the container, the second corner region being in direct contact with, and being formed by, the rear and upper walls fluidly coupling the connecting portion with the liquid container.

8. The liquid container of claim 7 wherein both a liquid and a gas above the liquid are contained within the liquid container.

9. The liquid container of claim 8 wherein first and second volumes are formed in the liquid container by a sloshing wave separating the first and second volumes, the first volume is coupled to the first opening, the second volume is coupled to the second opening, and the connecting portion providing a fluid coupling between the first volume and the second volume.

10. The liquid container of claim 9 wherein the sloshing wave is comprised of liquid and gas is contained in the first and second volumes.

11. The liquid container of claim 9 wherein the sloshing wave is generated by an acceleration applied to the liquid container.

12. The liquid container of claim 7 wherein the liquid container is adapted to be mounted in a motor vehicle, the front wall is arranged in a direction of travel of the motor vehicle, and the rear wall is opposed to the front wall.

13. The liquid container of claim 7 wherein the connecting portion is outside the liquid container.

14. The liquid container of claim 7 wherein the connecting portion is inside the liquid container.

15. The liquid container of claim 7 wherein the liquid container is a fuel tank and stored liquid is fuel.

16. The liquid container recited in claim 1 wherein the compensation tube is a continuous conduit providing a continuous, unimpeded passage between the first opening and the second opening.

17. The liquid container recited in claim 1 wherein the first opening terminates proximate a first opening in the frontal portion of the upper wall and the second opening terminates proximate an opening in the rear portion of the upper wall.

18. The liquid container recited in claim 7 wherein the compensation tube is a continuous conduit providing a continuous, unimpeded passage between the first opening and the second opening.

19. The liquid container recited in claim 18 wherein the first opening terminates proximate a first opening in the frontal portion of the upper wall and the second opening terminates proximate the rear portion of the upper wall.

20. The liquid container recited in claim 18 wherein the connecting portion has portions disposed parallel to adjacent portions of the upper wall.

21. The liquid container recited in claim 18 wherein the connecting portion is a horizontally extending hollow tube.

22. The liquid container recited in claim 19 wherein the connecting portion has portions disposed parallel to adjacent portions of the upper wall.

23. The liquid container recited in claim 7 wherein the tube provides a closed passageway between the first opening and the second opening.

24. The liquid container recited in claim 7 wherein the tube provides a straight closed passageway between the first opening and the second opening.

* * * * *